United States Patent
Nakagawa (10) Patent No.: US 9,937,755 B2
(45) Date of Patent: Apr. 10, 2018

(54) MOTORCYCLE TIRE

(71) Applicant: SUMITOMO RUBBER INDUSTRIES LTD., Kobe-shi (JP)

(72) Inventor: Mamoru Nakagawa, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 569 days.

(21) Appl. No.: 14/477,203

(22) Filed: Sep. 4, 2014

(65) Prior Publication Data

US 2015/0083294 A1 Mar. 26, 2015

(30) Foreign Application Priority Data

Sep. 20, 2013 (JP) .................................. 2013-195896

(51) Int. Cl.
    *B60C 11/03* (2006.01)
(52) U.S. Cl.
    CPC ...... *B60C 11/0306* (2013.01); *B60C 11/0302* (2013.01); *B60C 2011/0358* (2013.01); *B60C 2011/0374* (2013.01); *B60C 2011/0381* (2013.01); *B60C 2200/10* (2013.01)
(58) Field of Classification Search
    CPC .................................................. B60C 11/0302
    See application file for complete search history.

(56) References Cited

U.S. PATENT DOCUMENTS

D564,441 S * 3/2008 Itoi .............................. D12/534

| | | | |
|---|---|---|---|
| 2010/0126645 A1 | 5/2010 | Barboza et al. | |
| 2010/0282390 A1* | 11/2010 | Mariani | B60C 11/0302 152/454 |
| 2011/0162769 A1* | 7/2011 | Mariani | B60C 3/04 152/209.18 |

FOREIGN PATENT DOCUMENTS

| | | |
|---|---|---|
| JP | 56-090702 A * | 7/1981 |
| JP | 2012-176680 | 9/2012 |
| WO | WO 2008/124899 A1 | 10/2008 |
| WO | WO 2009/153821 A1 | 12/2009 |

OTHER PUBLICATIONS

Machine translation for Japan 56-090702 (no date).*
Extended European Search Report dated Jan. 26, 2015 in Patent Application No. 14180464.1.

* cited by examiner

*Primary Examiner* — Steven D Maki
(74) *Attorney, Agent, or Firm* — Oblon, McClelland, Maier & Neustadt, L.L.P.

(57) ABSTRACT

A motorcycle tire including a tire structure having a tread having outer surface curved in arc shape such that the outer surface is protruding toward radially outer side of the structure. The tread includes a center region and shoulder regions on sides of the center region, respectively, the center region is spanning 30% of a developed tread width with tire equator at the center of the center region, the tread has main grooves positioned at interval in tire circumferential direction and shoulder sub-grooves positioned in each shoulder region, each main groove is formed in V shape such that the V shape has a pair of inclined portions respectively extending from the tip in the center region toward the shoulder regions in tire rotation direction, and the sub-grooves are formed such that each sub-groove is extending in the circumferential direction and connected to one inclined portion without connecting adjacent main grooves.

20 Claims, 4 Drawing Sheets

MOTORCYCLE TIRE

CROSS-REFERENCE TO RELATED APPLICATIONS

The present application is based upon and claims the benefit of priority to Japanese Patent Application No. 2013-195896, filed Sep. 20, 2013, the entire contents of which are incorporated herein by reference.

BACKGROUND OF THE INVENTION

Field of the Invention

The present invention relates to a motorcycle tire that exhibits both wet performance and handling performance.

Description of Background Art

Laid-open Japanese Patent Publication No. 2012-176680 describes a motorcycle tire with an improved land ratio in the tread portion. In the motorcycle tire, the land ratio in each of the multiple divided regions of the tread portion is set within a range of 70~90%. The entire contents of this publication are incorporated herein by reference.

SUMMARY OF THE INVENTION

According to one aspect of the present invention, a motorcycle tire has a tire structure having a tread portion having an outer surface curved in an arc shape such that the outer surface is protruding toward a radially outer side of the tire structure. The tread portion includes a center region and shoulder regions on sides of the center region, respectively, the center region is spanning 30% of a developed tread width with a tire equator set at the center of the center region, the tread portion has main grooves positioned at an interval in a tire circumferential direction and shoulder sub-grooves positioned in each of the shoulder regions, each of the main grooves is formed in substantially a V shape such that the V shape has a pair of inclined portions respectively extending from the tip positioned in the center region toward the shoulder regions on the sides in a tire rotation direction, and the shoulder sub-grooves are formed such that each of the shoulder sub-grooves is extending in the tire circumferential direction and is connected to one of the inclined portions without connecting adjacent main grooves of the main grooves.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
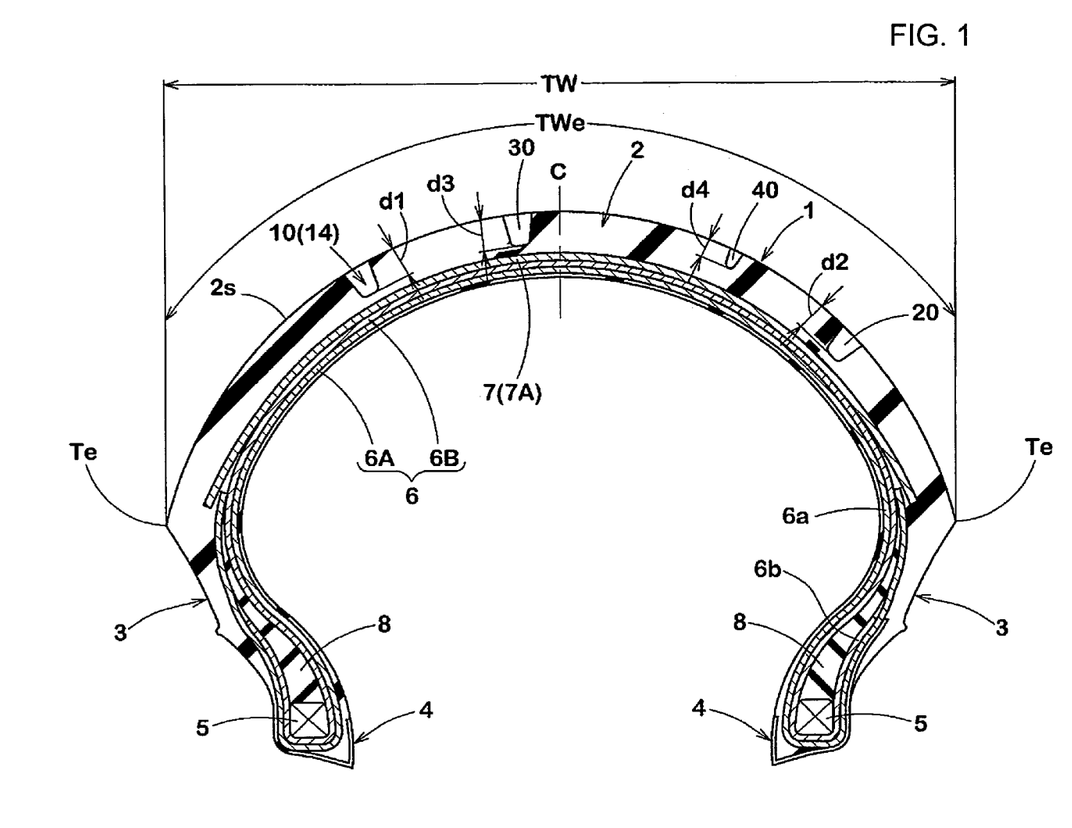
FIG. 1 is a cross-sectional view showing an example of the motorcycle tire related to the present invention.
Figure 2:
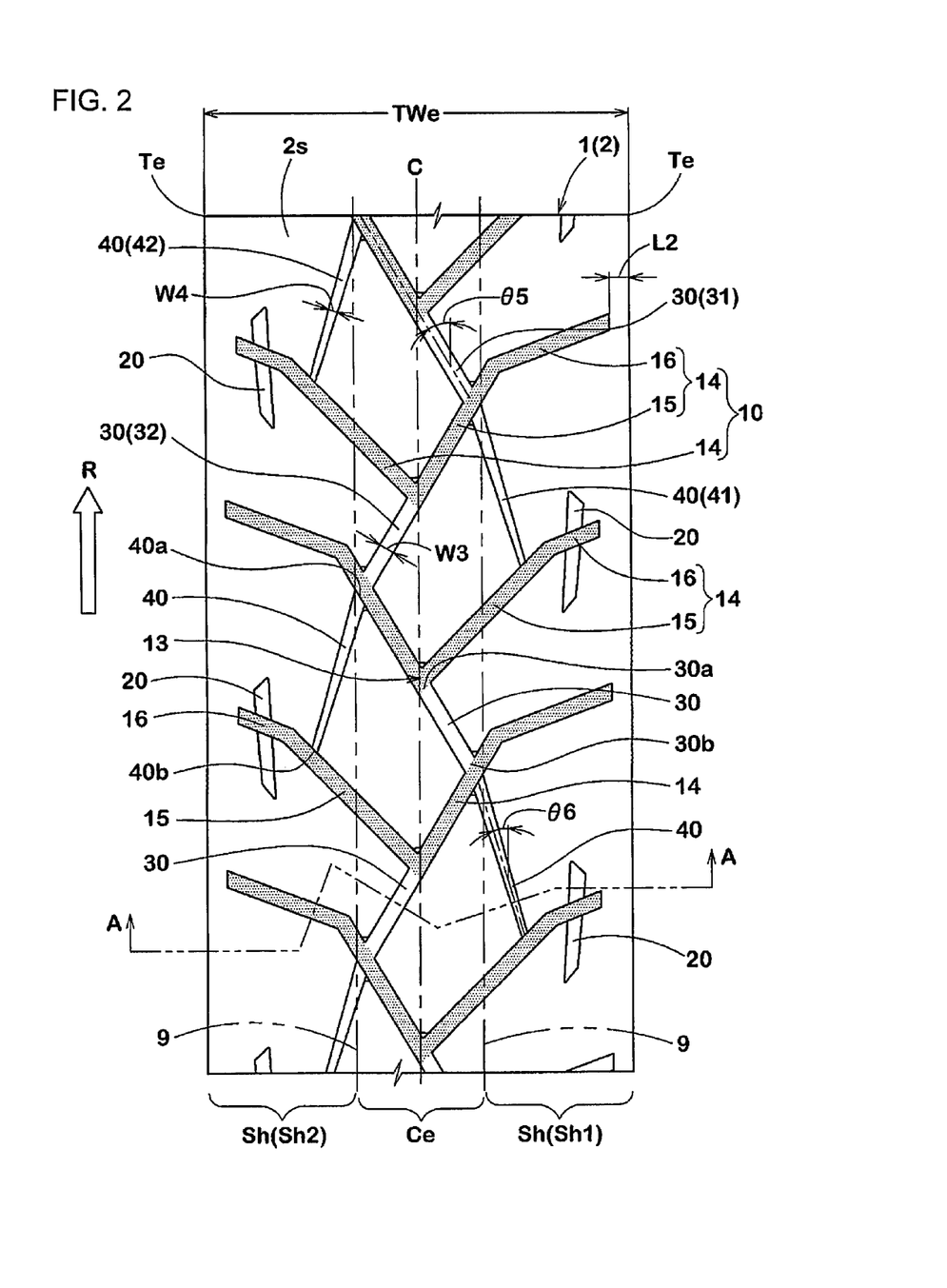
FIG. 2 is a developed view showing the tread pattern of the tread portion in FIG. 1.

Taken at a meridian line including the tire rotation axis, FIG. 1 shows a cross-sectional view of motorcycle tire 1 under a normal state, which is suitable for running on a paved road (hereinafter, may also be simply referred to as a "tire") as a preferred embodiment of the present invention. FIG. 2 is a developed view of the tread pattern of tread portion 2 of tire 1. FIG. 1 is a cross-sectional view taken at the "A-A" line in FIG. 2.

The aforementioned "normal state" indicates that tire 1 is mounted on a normal rim (not shown in the accompanying drawings) and is filled at a normal inflation pressure under a no-load state. In the present application, the measurements of tire 1 indicate those measured under a normal state, unless otherwise specified.

The aforementioned "normal rim" indicates the rim regulated by a regulatory system that includes standards on which the tire is based. For example, it is labeled "Normal Rim" by JATMA, "Design Rim" by TRA and "Measuring Rim" by ETRTO.

The aforementioned "normal inflation pressure" indicates the inflation pressure regulated by a regulatory system that includes standards on which the tire is based. For example, it is labeled "Maximum Air Pressure" by JATMA, maximum value in the table "Tire Load Limits at Various Cold Inflation Pressures" by TRA, and "Inflation Pressure" by ETRTO.

In tire 1 of the present embodiment, ground contact surface (2s) between tread ground edges (Te, Te) of tread portion 2 is curved in an arc protruding toward the radially outer side of the tire. Such tire 1 is capable of obtaining a sufficient ground contact area even while turning with a greater camber angle.

Tire 1 of the present embodiment is provided with carcass 6 and band layer 7.

Carcass 6 includes main body (6a) and turn-up portion (6b). Main body (6a) extends from tread portion 2 through sidewall portion 3 to reach bead core 5 on bead portion 4 on each of both sides. Turn-up portion (6b) is contiguous to main portion (6a) and is turned up around bead core 5 from the axially inner side of the tire to the outer side.

Carcass 6 is formed with two carcass plies (6A, 6B), for example. Two carcass plies (6A, 6B) are laminated in a radial direction of the tire in such a way that their respective carcass cords cross each other. The carcass cords are arranged by inclining at 75 to 90 degrees with respect to tire equator (C), for example. For carcass cords, organic fiber cords such as nylon, polyester and rayon are preferably used.

Bead apex rubber 8 is provided between main body (6a) and turn-up portion (6b). Bead apex rubber 8 is made of a hard rubber, and extends from bead core 5 toward the radially outer side of the tire.

Band layer 7 is positioned on the radially outer side of carcass 6 and on the inner side of tread portion 2 of the tire. Band layer 7 is formed with band ply (7A). Band ply (7A) is positioned on the radially outer side of carcass 6 of the tire. Band ply (7A) is formed as a so-called full band ply which covers substantially the entire width of tread portion 2. Such band ply (7A) binds the entire tread portion 2 and is effective for enhancing turning performance and high-speed steering stability.

In band ply (7A), band cords are arranged to make an angle of 5 degrees or less with respect to the tire circumferential direction. For band cords, organic fiber cords such as aramid and rayon, for example, are preferably used.

As shown in FIG. 2, rotation direction (R) is specified for tire 1 of the present embodiment so as to maximize the performance of the tread pattern. Rotation direction (R) is clearly indicated on the sidewall portion (omitted in the drawing) or the like.

Tread portion 2 includes center region (Ce) and shoulder region (Sh). Center region (Ce) is a region spanning 30% of developed tread width (TWe) with tire equator (C) set at the center. Shoulder region (Sh) is a region provided on each of both sides of center region (Ce) and positioned between edge 9 of center region (Ce) and tread ground edge (Te).

Developed tread width (TWe) is the distance between tread ground edges (Te, Te) along ground contact surface (2s) of tread portion 2 in a tread width direction.

Main groove 10 and shoulder sub-groove 20 are provided in tread portion 2. To simplify understanding, main groove 10 is slightly colored in FIG. 2.

Figure 3:
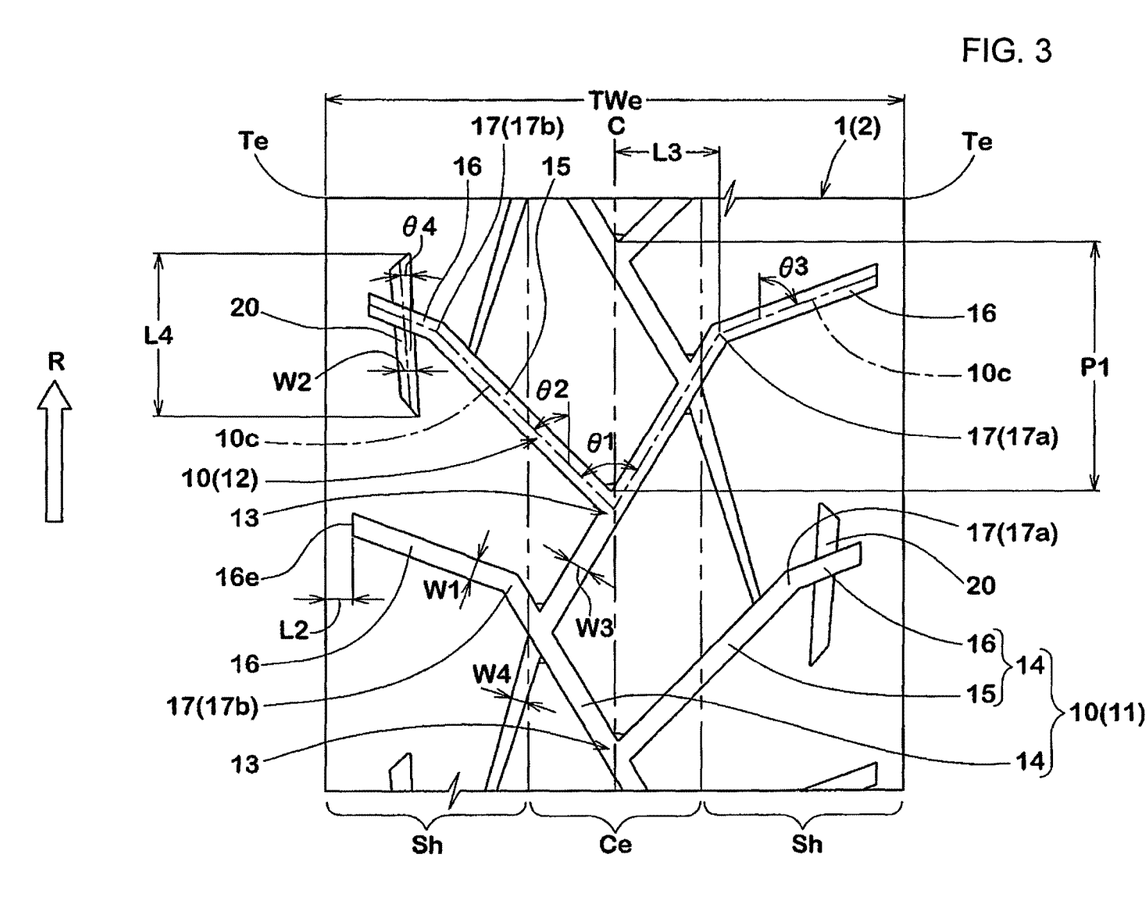
FIG. 3 is an enlarged developed view of the tread portion in FIG. 2.

FIG. 3 shows an enlarged developed view of tread portion 2. As shown in FIG. 3, multiple main grooves 10 are formed at intervals in the tire circumferential direction.

Main groove 10 is in substantially a V shape, having a pair of inclined portions 14 respectively extending from tip 13 positioned in center region (Ce) toward the shoulder regions (Sh) on both sides in the same direction as rotation direction (R). Because of such main groove 10, when a camber angle is given to tire 1, the water between tread portion 2 and the road surface is effectively expelled toward the tire equator (C) side where the gap is greater between the tire and the road surface. Thus, wet performance is enhanced.

Tip 13 is a portion where the inclination direction of center line (10c) of main groove 10 changes; namely, it is a point of inflection. Tip 13 of the present embodiment can be identified as a clear edge; however, that is not the only option.

Tip 13 is formed on tire equator (C) in the present embodiment. Such tip 13 improves linear motion stability. When tip 13 is shifted from tire equator (C), tire axial distance (L1) (not shown) between tip 13 and tire equator (C) is preferred to be no greater than 0.2 times, more preferably no greater than 0.1 times, the developed tread width (TWe).

In each main groove 10, the angle at tip 13 made by a pair of inclined portions (14, 14) is defined as opening angle ($\theta 1$) of tip 13. Opening angle ($\theta 1$) of tip 13 is preferred to be 70 degrees or greater, more preferably 75 degrees or greater, and is preferred to be 90 degrees or less, more preferably 85 degrees or less. By so setting, uneven wear of tread portion 2 is suppressed while excellent wet performance is exhibited.

Each inclined portion 14 has substantially constant groove width (W1), for example. Groove width (W1) is 5.0 to 7.0 mm, for example. Groove depth (d1) of inclined portion 14 (shown in FIG. 1) is 6.0 to 8.0 mm, for example. Such inclined portion 14 enhances wet performance while maintaining the rigidity of tread portion 2.

Each inclined portion 14 has inner portion 15 and outer portion 16. Inner portion 15 is positioned on the tip 13 side, and is inclined with respect to the tire circumferential direction. Outer portion 16 is contiguous to inner portion 15 and is inclined with respect to the circumferential direction of a tire at a greater angle than that of inner portion 15. Such inner portion 15 and outer portion 16 improve the relative rigidity of shoulder region (Sh) in a tire axial direction and enhances ground contact feel in the middle and final stages of a rotational motion.

In the present embodiment, inner portion 15 extends in a straight line. Angle ($\theta 2$) of inner portion 15 with respect to the tire circumferential direction is preferred to be 30 degrees or greater, more preferably 35 degrees or greater, and is preferred to be 50 degrees or less, more preferably 45 degrees or less. Such inner portion 15 exhibits excellent ground contact feel while maintaining wet performance in the initial stage of a linear motion and a rotational motion.

In the present embodiment, outer portion 16 extends in a straight line. Angle ($\theta 3$) of outer portion 16 with respect to the tire circumferential direction is preferred to be 60 degrees or greater, more preferably 65 degrees or greater, and is preferred to be 80 degrees or less, more preferably 75 degrees or less. Such outer portion 16 exhibits excellent ground contact feel in the middle and final stages of a rotational motion.

In the present embodiment, outer portion 16 does not reach tread ground edge (Te) and has outer edge (16e) on its inner side. Distance (L2) in a tire axial direction between outer edge (16e) of outer portion 16 and tread ground edge (Te) is preferred to be 4% or greater, more preferably 5% or greater, and is preferred to be 8% or less, more preferably 7% or less, of developed tread width (TWe). By so setting, handling performance is enhanced in the final stage of a rotational motion.

Inner portion 15 and outer portion 16 are connected at bending point 17 positioned in shoulder region (Sh). Namely, inclined portion 14 is bent in shoulder region (Sh). Such inclined portion 14 enhances ground contact feel in the middle and final stages of a rotational motion. It is an option for inner portion 15 and outer portion 16 to be connected so as to form a smooth curve. Such inner portion 15 and outer portion 16 suppress uneven wear of tread portion 2.

Distance (L3) in a tire axial direction between tire equator (C) and bending point 17 is preferred to be no less than 0.15 times, more preferably no less than 0.20 times, and is preferred to be no greater than 0.35 times, more preferably no greater than 0.30 times, the developed tread width (TWe). By so setting, ground contact feel is enhanced especially in the middle stage of a rotational motion.

Multiple shoulder sub-grooves 20 are provided in each shoulder region (Sh). Shoulder sub-groove 20 extends in the tire circumferential direction and is connected to inclined portion 14 without causing adjacent main grooves 10 to be connected. Such shoulder sub-group 20 enhances wet performance during turning. Moreover, since shoulder sub-groove 20 is not connected to its adjacent main groove 10, it maintains effectively the rigidity of shoulder region (Sh). Accordingly, rigidity is distributed smoothly in center region (Ce) and shoulder region (Sh). Thus, the change in ground contact feel in response to an increase in camber angle becomes linear, and handling performance is improved.

In the present embodiment, one shoulder sub-groove 20 is connected to main groove 10. Accordingly, the rigidity of shoulder region (Sh) is maintained in excellent balance.

Main grooves 10 include first main groove 11 and second main groove 12. In first main groove 11, shoulder sub-groove 20 is connected to one side of inclined portion 14. In second main groove 12, shoulder sub-groove 20 is connected to the other side of inclined portion 14. First main groove 11 and second main groove 12 are alternately formed in the tire circumferential direction. Accordingly, shoulder sub-grooves 20 are positioned to be staggered in the tire circumferential direction. Thus, rigidity in shoulder region (Sh) is maintained highly and in excellent balance, and handling performance is enhanced.

In first main groove 11, bending point (17a) of inclined portion 14 on one side with shoulder sub-groove 20 is positioned farther on the outer side in a tire axial direction than bending point (17b) of inclined portion 14 on the other side without shoulder sub-groove 20. Namely, in first main groove 11, the distance in a tire axial direction between tire equator (C) and bending point (17a) of inclined portion 14 on one side is greater than the distance in a tire axial direction between tire equator (C) and bending point (17b) of inclined portion 14 on the other side. Bending point 17 is set at a point on the center line of the groove.

In second main groove 12, bending point (17b) of inclined portion 14 on the other side with shoulder sub-groove 20 is positioned farther toward the outer side in a tire axial direction than bending point (17a) of inclined portion 14 on one side without sub-groove 20. Namely, in second main groove 12, the distance in a tire axial direction between tire equator (C) and bending point (17b) of inclined portion 14 on the other side is greater than the distance in a tire axial direction between tire equator (C) and bending point (17a) of inclined portion 14 on one side.

In first main groove 11 and second main groove 12 with bending points 17 as described above, each bending point 17 is not positioned closer to each other in the tire circumferential direction, thus suppressing local wear in tread portion 2.

Shoulder sub-groove 20 is preferred to be connected to outer portion 16 of inclined portion 14. Such shoulder sub-groove 20 enhances wet performance more effectively during full bank driving.

Shoulder sub-groove 20 of the present embodiment is connected to inclined portion 14 and forms a substantially cross-shaped groove intersection by extending toward both sides of inclined portion 14 in tire circumferential directions respectively. Such shoulder sub-groove 20 distributes rigidity uniformly around inclined portion 14, thus suppressing uneven wear. Shoulder sub-groove 20 may extend from inclined portion 14 only toward one side of the tire circumferential direction or only in the other direction. By so setting, steering stability is improved when driving force or braking force is exerted during full bank driving while wet performance is maintained.

Shoulder sub-groove 20 may be formed along the tire circumferential direction, but it is an option to incline the groove on the axially outer side of the tire in rotation direction (R), for example. In such a setting, angle (θ4) of shoulder sub-groove 20 with respect to the tire circumferential direction is 3.0 to 6.0 degrees, for example. While turning on a wet road surface, such shoulder sub-groove 20 effectively expels water between tread portion 2 and the road surface to the outside of the tire.

Shoulder sub-groove 20 has groove width (W2) which increases gradually in rotation direction (R). The ratio (Wmin/Wmax) of minimum width portion (Wmin) and maximum width portion (Wmax) (not shown in the drawings) of shoulder sub-groove 20 is 0.7 to 0.9, for example. Such shoulder sub-groove 20 further effectively enhances wet performance.

Groove depth (d2) of shoulder sub-groove 20 (shown in FIG. 1) is 6.0 to 8.0 mm, for example. Such shoulder sub-groove 20 exhibits excellent wet performance while maintaining the rigidity of tread portion 2.

Length (L4) of shoulder sub-groove 20 in the tire circumferential direction is preferred to be no less than 0.70 times, more preferably no less than 0.72 times, but no greater than 0.75 times, more preferably no greater than 0.73 times, the pitch (P1) of main groove 10 in the tire circumferential direction. Such shoulder sub-groove 20 exhibits both wet performance and handling performance. The pitch (P1) in the tire circumferential direction is measured based on the aforementioned tips 13 of main grooves 10 positioned adjacent to each other in the tire circumferential direction.

As shown in FIG. 2, tread portion 2 is provided with center joint groove 30 and middle joint groove 40. Center joint groove 30 and middle joint groove 40 connect adjacent main grooves (10, 10).

One end (30a) of center joint groove 30 is connected to tip 13 of one main groove 10. The other end (30b) of center joint groove 30 is connected to inclined portion 14 of the other main groove 10. Such center joint groove 30 enhances wet performance in the initial stage of a rotational motion.

The other end (30b) of center joint groove 30 is preferred to be connected to inner portion 15 of inclined portion 14 in main groove 10. Furthermore, the other end (30b) of center joint groove 30 is preferred to be connected to inclined portion 14 where no shoulder sub-groove 20 is provided. By so setting, the rigidity of tread portion 2 is maintained and both wet performance and handling performance are achieved.

Center joint groove 30 includes first center joint groove 31 and second center joint groove 32. First center joint groove 31 inclines toward the one shoulder region (Sh1) in the opposite direction of rotation direction (R). Second center joint groove 32 inclines toward the other shoulder region (Sh2) in the opposite direction of rotation direction (R). First center joint groove 31 and second center joint groove 32 are formed alternately in the tire circumferential direction. Such first center joint groove 31 and second center joint groove 32 distribute rigidity uniformly in center region (Ce), while suppressing uneven wear in tread portion 2.

Angle (θ5) of center joint groove 30 with respect to the tire circumferential direction is preferred to be 20 degrees or greater, more preferably 25 degrees or greater, and is preferred to be 40 degrees or less, more preferably 35 degrees or less. Such center joint groove 30 maintains steering stability during a linear motion while exhibiting excellent wet performance.

Center joint groove 30 has a substantially constant groove width (W3), for example. Groove width (W3) of center joint groove 30 is 5.0 to 7.0 mm, for example. Groove depth (d3) of center joint groove 30 (shown in FIG. 1) is 6.0 to 8.0 mm, for example. Such center joint groove 30 exhibits both wet performance and handling performance.

One end (40a) of middle joint groove 40 is connected to inclined portion 14 where no shoulder sub-groove 20 is provided. One end (40a) of middle joint groove 40 faces center joint groove 30 with inclined portion 14 disposed in between. The other end (40b) of middle joint groove 40 is connected to inclined portion 14 where shoulder sub-groove 20 is provided. Such middle joint groove 40 exhibits excellent wet performance.

One end (40a) and the other end (40b) of middle joint groove 40 are each preferred to be connected to inner portion 15 of inclined portion 14. Such middle joint groove 40 enhances wet performance in the initial and middle stages of a rotational motion.

Middle joint groove 40 includes first middle joint groove 41 and second middle joint groove 42. First middle joint groove 41 is formed in the one shoulder region (Sh1) and is inclined toward the tire equator (C) in tire rotation direction (R). Second middle joint groove 42 is formed in the other shoulder region (Sh2) and is inclined toward the tire equator (C) in tire rotation direction (R). First middle joint groove 41 and second middle joint groove 42 are formed alternately in the tire circumferential direction. Such first middle joint groove 41 and second middle joint groove 42 effectively maintain the rigidity of tread portion 2 and exhibit excellent handling performance.

Angle (θ6) of each middle joint groove 40 in the tire circumferential direction is preferred to be 10 degrees or greater, more preferably 15 degrees or greater, and is preferred to be 30 degrees or less, more preferably 25 degrees or less. Such middle joint groove 40 effectively expels water between tread portion 2 and the road surface to the outside of the tire when turning on a wet road surface.

Middle joint groove 40 has groove width (W4) that gradually increases in rotation direction (R), for example. Groove width (W4) of middle joint groove 40 is 3.0 to 6.0 mm, for example.

As shown in FIG. 1, groove depth (d4) of middle joint groove 40 is preferred to be no less than 0.38 times, more preferably no less than 0.42 times, but no greater than 0.64 times, more preferably no greater than 0.60 times, the groove depth (d1) of main groove 10. Such middle joint groove 40 exhibits both wet performance and handling performance.

So far, a preferred embodiment of the present invention has been described. However, the present invention is not limited to the above embodiment, and various modifications of the embodiment are possible.

EXAMPLES

Test motorcycle tires each having the basic structure shown in FIG. 1 and the tread pattern shown in FIG. 2 were prepared according to their respective specifications shown in Table 1. As a comparative example, a motorcycle tire having the tread pattern in FIG. 4 was prepared. Those tires were mounted on the front and rear wheels of a test vehicle, and their wet performance and handling performance were tested. Specifications and the test method shared by the test tires were as follows.

test vehicle: displacement of 700 cc
tire size: front wheel: 120/70R17; rear wheel: 160/60R17
rim size: front wheel: 3.50×17; rear wheel: 4.50×17

Wet Performance

On an asphalt surface course with a radius of 40 m, a puddle was formed to have a water depth of 5 mm and a length of 20 m. A test vehicle entered the course while increasing its speed in stages, and lateral acceleration (lateral G) was measured, and the average lateral G of the rear wheel at speeds of 50 to 80 km/h was calculated. The result was shown as an index based on the value obtained in Comparative Example 1 set as 100. Excellence of wet performance is indicated by higher index values.

Handling Performance

Based on the feeling of the driver, handling performance was evaluated when the test vehicle above ran on a dry asphalt road surface of the test course. The result was shown as a grade based on the value obtained in Comparative Example 1 set as 100. Excellence is indicated by higher grade values. Test results are shown in Table 1.

TABLE 1

Figure 4:
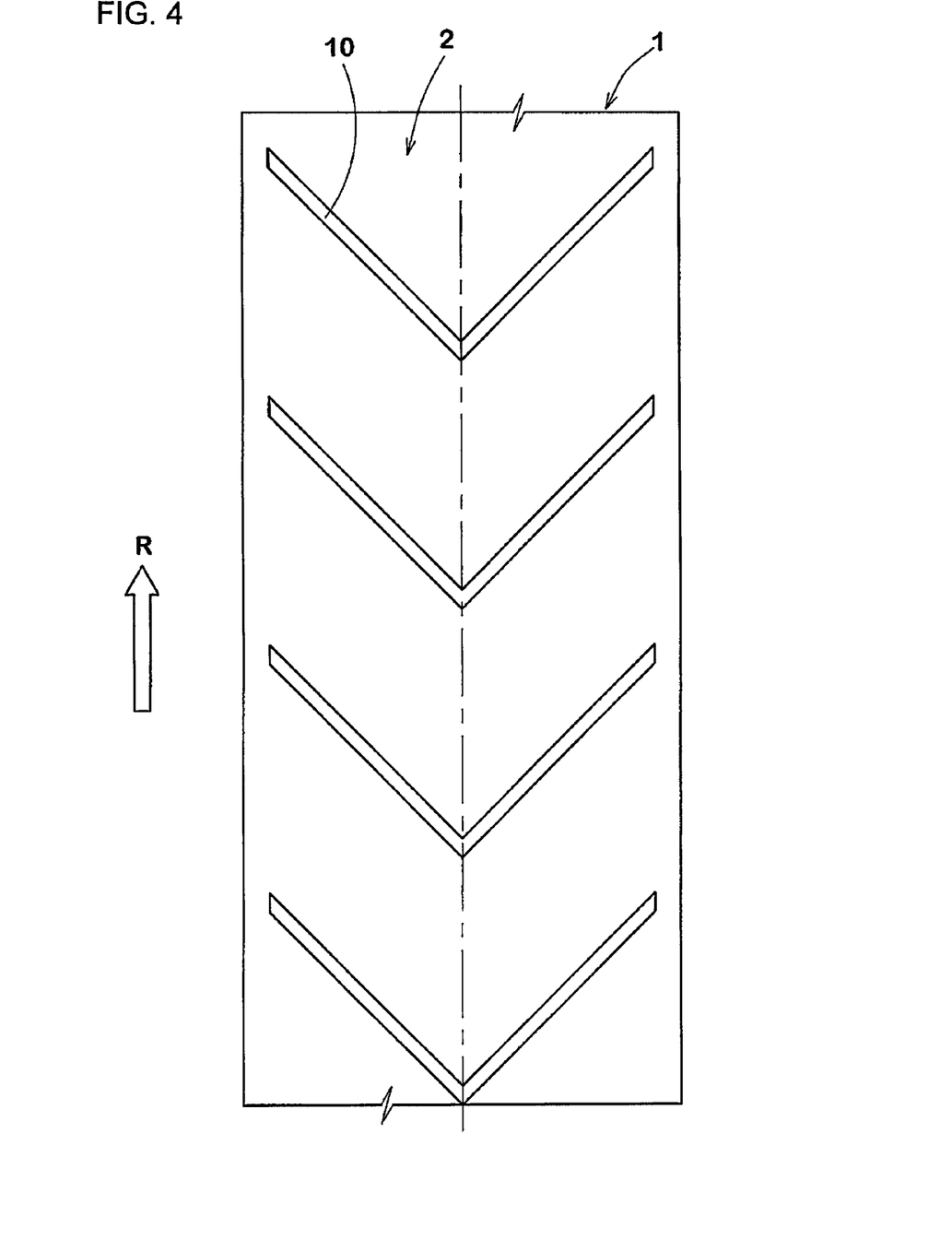
FIG. 4 is a developed view of the tread portion of a conventional motorcycle tire.

| | comparative example 1 | example 1 | example 2 | example 3 | example 4 | example 5 | example 6 | example 7 | example 8 | example 9 |
|---|---|---|---|---|---|---|---|---|---|---|
| tread pattern | FIG. 4 | FIG. 1 | FIG. 1 | FIG. 1 | FIG. 1 | FIG. 1 | FIG. 1 | FIG. 1 | FIG. 1 | FIG. 1 |
| opening angle θ1 of tip (°) | 90 | 70 | 60 | 65 | 75 | 80 | 70 | 70 | 70 | 70 |
| angle θ2 of inner portion (°) | — | 30~45 | 30~45 | 30~45 | 30~45 | 30~45 | 30~45 | 30~45 | 30~45 | 30~45 |
| angle θ3 of outer portion (°) | — | 60~80 | 60~80 | 60~80 | 60~80 | 60~80 | 60~80 | 60~80 | 60~80 | 60~80 |
| length L4 of shoulder sub-groove/pitch P1 | — | 0.40 | 0.40 | 0.40 | 0.40 | 0.40 | 0.30 | 0.35 | 0.45 | 0.50 |
| center joint groove | No | yes | yes | yes | yes | yes | yes | yes | yes | yes |
| angle θ5 of center joint groove (°) | — | 30 | 30 | 30 | 30 | 30 | 30 | 30 | 30 | 30 |
| middle joint groove | No | yes | yes | yes | yes | yes | yes | yes | yes | yes |
| angle θ6 of middle joint groove (°) | — | 20 | 20 | 20 | 20 | 20 | 20 | 20 | 20 | 20 |
| wet performance (index) | 100 | 110 | 110 | 110 | 110 | 109 | 108 | 109 | 110 | 111 |
| handling performance (grade) | 100 | 110 | 108 | 109 | 109 | 108 | 110 | 110 | 109 | 109 |

| | example 10 | example 11 | example 12 | example 13 | example 14 | example 15 | example 16 | example 17 | example 18 | example 19 |
|---|---|---|---|---|---|---|---|---|---|---|
| tread pattern | FIG. 1 | FIG. 1 | FIG. 1 | FIG. 1 | FIG. 1 | FIG. 1 | FIG. 1 | FIG. 1 | FIG. 1 | FIG. 1 |
| opening angle θ1 of tip (°) | 70 | 70 | 70 | 70 | 70 | 30 | 50 | 100 | 115 | 70 |
| angle θ2 of inner portion (°) | 30~45 | 30~45 | 30~45 | 30~45 | 30~45 | 10~20 | 20~30 | 45~55 | 55~60 | 30~45 |
| angle θ3 of outer portion (°) | 60~80 | 60~80 | 60~80 | 60~80 | 60~80 | 60~80 | 60~80 | 60~80 | 60~80 | 30~40 |
| length L4 of shoulder sub-groove/pitch P1 | 0.60 | 0.40 | 0.40 | 0.40 | 0.40 | 0.40 | 0.40 | 0.40 | 0.40 | 0.40 |
| center joint groove | Yes | yes | yes | yes | yes | yes | yes | yes | yes | yes |
| angle θ5 of center joint groove (°) | 30 | 30 | 30 | 30 | 30 | 30 | 30 | 30 | 30 | 30 |
| middle joint groove | Yes | yes | yes | yes | yes | yes | yes | yes | yes | yes |
| angle θ6 of middle joint groove (°) | 20 | 10 | 15 | 25 | 30 | 20 | 20 | 20 | 20 | 20 |
| wet performance (index) | 111 | 111 | 110 | 109 | 109 | 112 | 111 | 109 | 107 | 112 |
| handling performance (grade) | 108 | 107 | 109 | 110 | 109 | 107 | 108 | 110 | 111 | 107 |

| | example 20 | example 21 | example 22 | example 23 | example 24 | example 25 | example 26 | example 27 | example 28 | example 29 |
|---|---|---|---|---|---|---|---|---|---|---|
| tread pattern | FIG. 1 | FIG. 1 | FIG. 1 | FIG. 1 | FIG. 1 | FIG. 1 | FIG. 1 | FIG. 1 | FIG. 1 | FIG. 1 |
| opening angle θ1 of tip (°) | 70 | 70 | 70 | 70 | 70 | 70 | 70 | 70 | 70 | 70 |
| angle θ2 of inner portion (°) | 30~45 | 30~45 | 30~45 | 30~45 | 30~45 | 30~45 | 30~45 | 30~45 | 30~45 | 30~45 |

TABLE 1-continued

| | | | | | | | | | | |
|---|---|---|---|---|---|---|---|---|---|---|
| angle θ3 of outer portion (°) | 40~50 | 50~60 | 80~90 | 60~80 | 60~80 | 60~80 | 60~80 | 60~80 | 60~80 | 60~80 |
| length L4 of shoulder sub-groove/pitch P1 | 0.40 | 0.40 | 0.40 | 0.40 | 0.40 | 0.40 | 0.40 | 0.40 | 0.40 | 0.40 |
| center joint groove | Yes | yes | yes | no | yes | yes | yes | yes | yes | yes |
| angle θ5 of center joint groove (°) | 30 | 30 | 30 | — | 10 | 40 | 30 | 30 | 30 | 30 |
| middle joint groove | Yes | yes | yes | yes | yes | yes | no | yes | yes | yes |
| angle θ6 of middle joint groove (°) | 20 | 20 | 20 | 20 | 20 | 20 | — | 10 | 30 | 40 |
| wet performance (index) | 111 | 111 | 108 | 109 | 108 | 110 | 108 | 110 | 108 | 107 |
| handling performance (grade) | 107 | 108 | 110 | 108 | 109 | 109 | 100 | 108 | 110 | 110 |

The results of the above test showed that tires of the examples exhibited both wet performance and handling performance.

In motorcycle tires, grooves may be formed in their tread portions. Grooves formed in the tread portion expel water from between the road surface and the tread portion to the outside of the tire during wet running and enhance wet performance.

However, such grooves reduce the rigidity of the tread portion, thus lowering handling performance during turning.

In a motorcycle tire, change in ground contact feel in response to an increase in camber angle may not be linear. Moreover, to obtain a motorcycle tire capable of exhibiting both wet performance and handling performance, further improvements are required.

A motorcycle tire according to an embodiment of the present invention is capable of exhibiting both wet performance and handling performance, basically by improving positions or the like of the grooves formed in the tread portion.

In a motorcycle tire according to an embodiment of the present invention, the outer surface of the tread portion is curved in an arc shape protruding toward the radially outer side of the tire, and the rotation direction of the tire is specified. Such a motorcycle tire has the following characteristics; the tread portion includes a center region which spans 30% of the developed tread width with the tire equator set at its center, and a shoulder region positioned on each of both sides of the center region; the tread portion is provided with multiple main grooves positioned at intervals in a tire circumferential direction and multiple shoulder sub-grooves positioned in each shoulder region; the main grooves are each in substantially a V shape, having a pair of inclined portions respectively extending from the tip positioned in the center region toward the shoulder regions on both sides in the same direction as the rotation direction; and each shoulder sub-groove extends in the tire circumferential direction and is connected to one inclined portion without causing adjacent main grooves to be connected.

A motorcycle tire according to an embodiment of the present invention is preferred to have a shoulder sub-groove connected to each of the main grooves.

A motorcycle tire according to an embodiment of the present invention is preferred to include a first main groove with a shoulder sub-groove connected to the inclined portion on one side, and a second main groove with a shoulder sub-groove connected to the inclined portion on the other side, and the first main groove and the second main groove are preferred to be alternately formed in the tire circumferential direction.

In a motorcycle tire according to an embodiment of the present invention, each inclined portion is preferred to have an inner portion positioned on the tip side and inclining with respect to the tire circumferential direction, and an outer portion formed to be contiguous to the inner portion and inclining with respect to the tire circumferential direction at a greater angle than that of the inner portion.

In a motorcycle tire according to an embodiment of the present invention, the inner portion and the outer portion are each preferred to extend in a straight line and to be connected to each other at a bending point positioned in the shoulder region.

In a motorcycle tire according to an embodiment of the present invention, the bending point of the inclined portion on one side of the first main groove is preferred to be positioned farther on the outer side in a tire axial direction than the bending point of the inclined portion on the other side.

In a motorcycle tire according to an embodiment of the present invention, the bending point of the inclined portion on the other side of the second main groove is preferred to be positioned farther on the outer side in a tire axial direction than the bending point of the inclined portion on one side.

In a motorcycle tire according to an embodiment of the present invention, a center joint groove connecting adjacent main grooves is further formed in the tread portion. It is preferred that one end of the center joint groove be connected to the tip of one main groove, and the other end of the center joint groove be connected to one inclined portion of the other main groove.

In a motorcycle tire according to an embodiment of the present invention, the length of the shoulder sub-groove in the tire circumferential direction is preferred to be 0.70 to 0.75 times the pitch in the tire circumferential direction based on the tips of the main grooves adjacent to each other in the tire circumferential direction.

In a motorcycle tire according to an embodiment of the present invention, the angle of the outer portion with respect to the tire circumferential direction is preferred to be 60~80 degrees.

The tread portion of a motorcycle tire according to an embodiment of the present invention includes the center region, which is a region spanning 30% of the developed tread width with the tire equator set at its center, and a shoulder region positioned on each of both sides of the center region. The tread portion is provided with multiple main grooves positioned at intervals in the tire circumferential direction and with multiple shoulder sub-grooves positioned in each shoulder region.

The main grooves are each in substantially a V shape, having a pair of inclined portions that respectively extend from the tip positioned in the center region toward the shoulder regions on both sides in the same direction as the rotation direction. When a camber angle is given to the tire, such main grooves effectively expel water from between the tread portion and the road surface, and thus wet performance is improved.

Each shoulder sub-groove extends in the tire circumferential direction and is connected to one inclined portion without causing adjacent main grooves to be connected. Such a shoulder sub-groove enhances wet performance during turning. Moreover, since such a shoulder sub-groove is not connected to its adjacent main groove, the rigidity of the shoulder region is effectively maintained. Accordingly, rigidity is smoothly distributed in the center region and shoulder regions. Thus, the change in ground contact feel in response to an increase in the camber angle is linear and handling performance is enhanced.

As described above, a motorcycle tire according to an embodiment of the present invention enhances both wet performance and handling performance.

Obviously, numerous modifications and variations of the present invention are possible in light of the above teachings. It is therefore to be understood that within the scope of the appended claims, the invention may be practiced otherwise than as specifically described herein.

What is claimed is:

1. A motorcycle tire, comprising:
a tire structure having a tread portion having an outer surface curved in an arc shape such that the outer surface is protruding toward a radially outer side of the tire structure,
wherein the tread portion includes a center region and a plurality of shoulder regions on sides of the center region, respectively, the center region has a tire equator set at a center of the center region, the tread portion has a plurality of main positioned at an interval in a tire circumferential direction, a plurality of shoulder sub-grooves positioned in each of the shoulder regions, a plurality of center joint grooves formed in the tread portion such that each of the center joint grooves is connecting adjacent main grooves of the plurality of main grooves and a plurality of middle joint grooves formed in the tread portion such that each of the middle joint grooves is connecting adjacent main grooves of the plurality of main grooves, each of the main grooves is formed in substantially a V shape such that the V shape has a pair of inclined portions respectively extending from a tip positioned in the center region toward the shoulder regions on the sides in a tire rotation direction, the shoulder sub-grooves are formed such that each of the shoulder sub-grooves is extending in the tire circumferential direction and is connected to one of the inclined portions without connecting adjacent main grooves of the main grooves, each of the middle joint grooves has one end facing one of the center joint grooves and the other end connected to one of the inclined portions of another one of the main grooves, and each of the center joint grooves has one end connected to the tip of one of the main grooves and the other end connected to one of the inclined portions of another one of the main grooves.

2. The motorcycle tire according to claim 1, wherein each of the main grooves is connected to one of the shoulder sub-grooves.

3. The motorcycle tire according to claim 2, wherein the plurality of main grooves includes a plurality of first main grooves and a plurality of second main grooves such that each of the first main grooves has one of the shoulder sub-grooves connected to one of the inclined portions on one side and that each of the second main grooves has one of the shoulder sub-grooves connected to one of the inclined portions on the other side, and the first main grooves and the second main grooves are alternately formed in the tire circumferential direction.

4. The motorcycle tire according to claim 3, wherein each of the inclined portions comprises an inner portion and an outer portion such that the inner portion is positioned on a tip side and inclining with respect to the tire circumferential direction and that the outer portion is formed contiguous to the inner portion and inclining with respect to the tire circumferential direction at an angle greater an angle of the inner portion.

5. The motorcycle tire according to claim 4, wherein each of the inner portion and the outer portion is extending in a straight line and connected to each other at a bending point positioned in one of the shoulder regions.

6. The motorcycle tire according to claim 5, wherein each of the first main grooves has the bending point of one of the inclined portions on one side positioned farther on an outer side in a tire axial direction than the bending point of one of the inclined portions on the other side.

7. The motorcycle tire according to claim 6, wherein each of the second main grooves has the bending point of one of the inclined portions on the other side positioned farther on the outer side in the tire axial direction than the bending point of one of the inclined portions on the one side.

8. The motorcycle tire according to claim 6, wherein each of the shoulder sub-grooves has a length in the tire circumferential direction which is set in a range of 0.70 to 0.75 times a pitch of the main grooves adjacent to each other at the tip in the tire circumferential direction.

9. The motorcycle tire according to claim 6, wherein the angle of the outer portion with respect to the tire circumferential direction is set in a range of 60 to 80 degrees.

10. The motorcycle tire according to claim 5, wherein each of the second main grooves has the bending point of one of the inclined portions on one side positioned farther on an outer side in a tire axial direction than the bending point of one of the inclined portions on the other side.

11. The motorcycle tire according to claim 5, wherein each of the shoulder sub-grooves has a length in the tire circumferential direction which is set in a range of 0.70 to 0.75 times a pitch of the main grooves adjacent to each other at the tip in the tire circumferential direction.

12. The motorcycle tire according to claim 5, wherein the angle of the outer portion with respect to the tire circumferential direction is set in a range of 60 to 80 degrees.

13. The motorcycle tire according to claim 4, wherein each of the shoulder sub-grooves has a length in the tire circumferential direction which is set in a range of 0.70 to 0.75 times a pitch of the main grooves adjacent to each other at the tip in the tire circumferential direction.

14. The motorcycle tire according to claim 4, wherein the angle of the outer portion with respect to the tire circumferential direction is set in a range of 60 to 80 degrees.

15. The motorcycle tire according to claim 2, wherein each of the shoulder sub-grooves has a length in the tire circumferential direction which is set in a range of 0.70 to 0.75 times a pitch of the main grooves adjacent to each other at the tip in the tire circumferential direction.

16. The motorcycle tire according to claim 3, wherein each of the main grooves is formed in substantially the V shape such that the pair of inclined portions is respectively extending from the tip positioned on the tire equator in the center region toward the shoulder regions on the sides in the tire rotation direction.

17. The motorcycle tire according to claim 2, wherein each of the shoulder sub-grooves has a length in the tire circumferential direction which is set in a range of 0.70 to 0.75 times a pitch of the main grooves adjacent to each other at the tip in the tire circumferential direction.

18. The motorcycle tire according to claim 2, wherein each of the main grooves is formed in substantially the V shape such that the pair of inclined portions is respectively extending from the tip positioned on the tire equator in the center region toward the shoulder regions on the sides in the tire rotation direction, and the center region is spanning 30% of a developed tread width.

19. The motorcycle tire according to claim 1, wherein each of the shoulder sub-grooves has a length in the tire circumferential direction which is set in a range of 0.70 to 0.75 times a pitch of the main grooves adjacent to each other at the tip in the tire circumferential direction.

20. The motorcycle tire according to claim 1, wherein each of the main grooves is formed in substantially the V shape such that the pair of inclined portions is respectively extending from the tip positioned on the tire equator in the center region toward the shoulder regions on the sides in the tire rotation direction.

\* \* \* \* \*